United States Patent Office 3,030,768
Patented Apr. 24, 1962

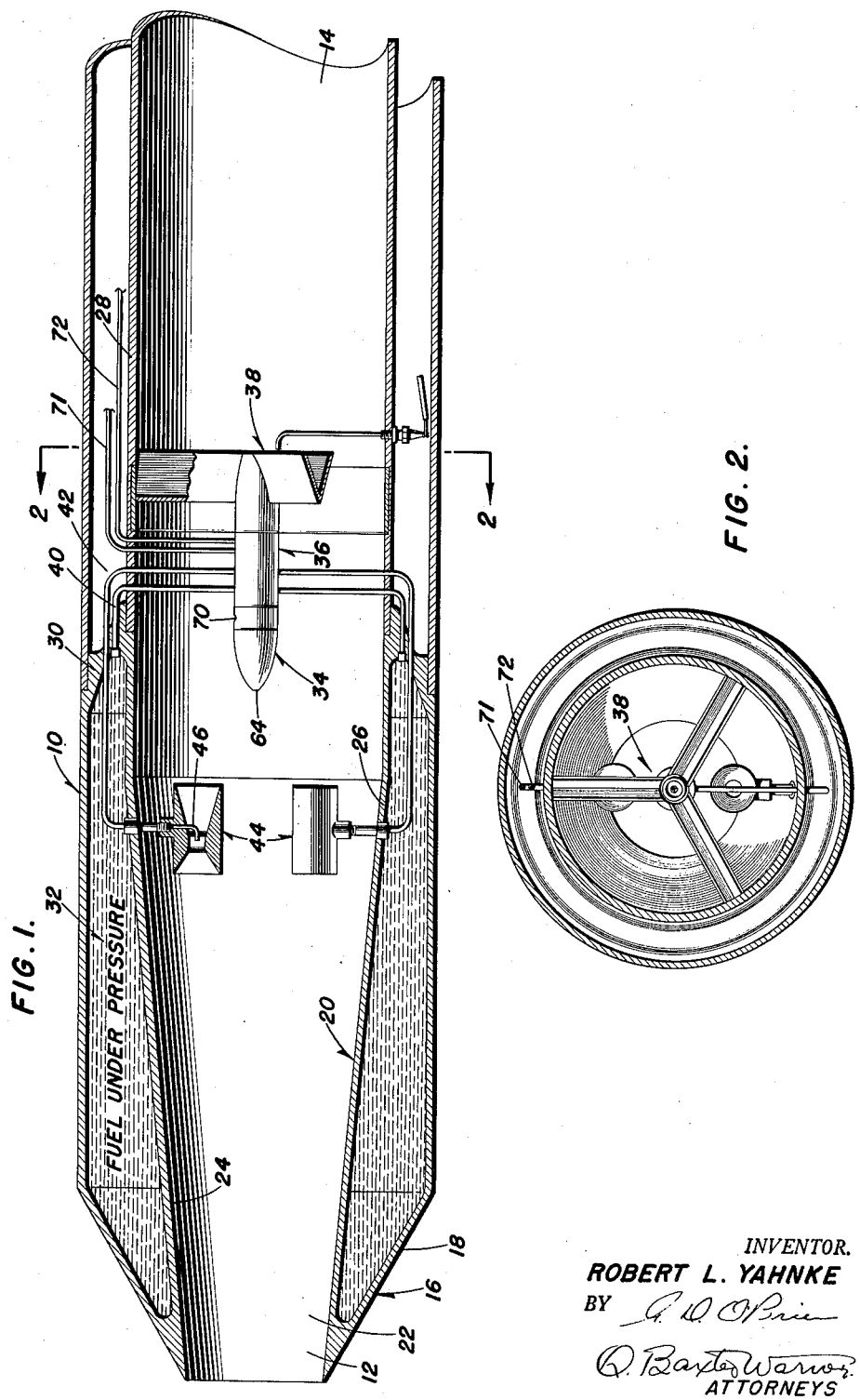

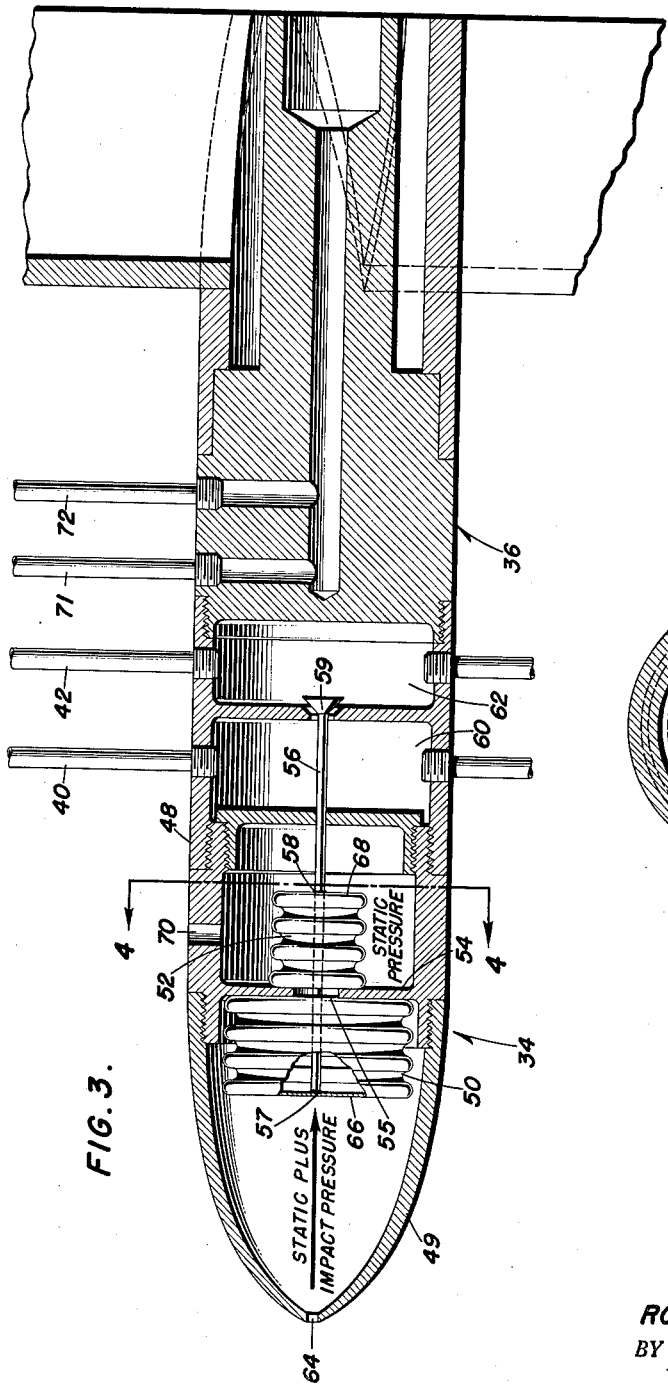
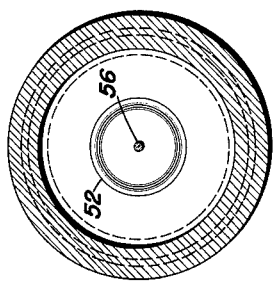

3,030,768
FUEL CONTROL DEVICE FOR RAM-JET ENGINES
Robert L. Yahnke, Munster, Ind., assignor, by mesne assignments, to the United States of America as represented by the Secretary of the Navy
Filed July 17, 1952, Ser. No. 299,389
9 Claims. (Cl. 60—35.6)

This invention relates, in general, to aerial missiles, and in particular, to an arrangement for controlling the rate of flow of fuel to combustors of supersonic ram-jet engines.

Since ram-jet engines depend on ram pressure for operation, the engines as now operated are accelerated to supersonic speeds prior to ignition of the liquid fuel mixture. There is also the possibility that combustion of the fuel mixture will be lost during the flight of the aerial missile. It is, therefore, necessary to ignite the fuel mixture during the flight of the aerial missile. As a consequence, adequate and precise control of the air-fuel ratio is required prior to as well as during combustion of the fuel mixture.

It has been ascertained that on changing from "cold" or non-burning flight conditions to "hot" or burning conditions, an abrupt change of both static and impact pressures occur. For example, at a fixed flight speed of 1.6 Mach number at sea level conditions, a change from "cold" non-burning conditions to "hot" or burning conditions at 90 percent efficiency causes an increase of static pressure from approximately 22 to 56 pounds per square inch absolute, and a decrease of impace pressure from approximately 17 to 2 pounds per square inch.

Therefore, if it is desired to maintain the same air-fuel ratio for both non-burning and burning conditions, it is obvious that neither static nor impact pressure can be utilized separately to precisely control fluel flow, since both undergo a radical change when changing from non-burning to burning conditions. In addition, since the change of static pressure over-compensates for the change of impact pressure, a valve controlled by the stagnation (static plus impact) pressure will not maintain the same air-fuel ratio before and after combustion.

It is the principal object of this invention, therefore, to provide a meter arrangement for precisely controlling the flow of fuel to the combustors of supersonic ram-jet engines.

Another important object of this invention is to provide a metering arrangement that utilizes a fractional part of the static pressure plus the full impact pressure inside the duct at the diffuser exit to control the fuel flow to the combustors of ram-jet engines.

And another object of the invention is to provide a metering valve arrangement operated by either static or impact pressures inside the duct at the diffuser exit, or a combination of these pressures, to maintain either a given air-fuel ratio for varying rates of air intake to the ram-jet engine or an air-fuel ratio which varies with the rate of air intake.

And another object of the invention is to provide a fuel control arrangement for ram-jet engines that is economical to manufacture, reliable and efficient in operation, and easy to install therein.

These and other objects of the invention will be apparent from the following description, accompanying drawings and claims.

According to the invention, use is made of static and stagnation (static plus impact) pressures inside the duct at the diffuser exit of a ram-jet engine to control the fuel flow or air-fuel mixture to the combustor. This is made possible because, in either the condition of flight of an aerial missile with no combustion or that of flight with combustion at a predetermined efficiency, both the impact and static pressures are directly proportional to the rate of air flow through the combustor. Thus, for either of these conditions of flight of an aerial missile, a valve mechanism operated by either static or impact pressures maintains either a given air to fuel ratio for varying rates of air intake to the engine or an air fuel ratio which varies with the rate of air intake.

In the actual embodiment of the invention, a compact metering valve mechanism, actuated by two evacuated Sylphon type metal bellows, is utilized to translate stagnation and static pressures in the duct at the diffuser exit into a force controlling a valve mechanism located in the fuel line. Stagnation pressure (static plus impact) acts on the large bellows and only static pressure acts on the small bellows. Depending upon the relative areas of the bellows' heads, a fraction of the static pressure acting on the large bellows is cancelled by the static pressure acting on the small bellows, leaving the remaining impact and static pressure differential to operate the valve mechanism. By means of this arrangement, the fuel is metered prior to being injected into the air stream. The metered fuel is then injected into the air stream passing through the duct of the ram-jet engine by a series of injection nozzles. The fuel mixture then passes to the combustor of the ram-jet engine, where it is ignited. The gases liberated by the burning of the fuel mixture are subsequently utilized to furnish the source of propulsion for the aerial missile.

In the accompanying drawings:
FIG. 1 is a fragmentary view partially in elevation, of a ram-jet engine embodying the invention;
FIG. 2 is a cross-section on line 2—2 of FIG. 1;
FIG. 3 is an enlarged view of the fuel metering arrangement shown in FIG. 1; and
FIG. 4 is a cross-section view on line 4—4 of FIG. 3.

Prior to describing an actual embodiment of the invention, consideration will first be given to the theory of operation of a fuel metering arrangement or device such as provided by the present invention.

A study of the flow of air through a ram-jet engine duct has indicated that for constant combustion efficiency with a Mach number of one (1) in the tailpipe throat, both static and stagnation diffuser outlet pressures are nearly linear with air rate. This relationship is quite insensitive to the temperature of the air, and a fuel meter arrangement constructed to deliver an amount of fuel directly proportional to either stagnation (static plus impact) pressure, the static pressure or a combination of these two pressures, will hold a constant air-fuel ratio.

While the above relationship holds for a Mach number of one (1) in the tailpipe throat, it does not hold for other conditions, and for the condition previous to the initiation of combustion, stagnation and static pressure at the diffuser outlet are both considerably lower than when combustion is taking place. Impact pressure, the difference between stagnation and static pressures, on the other hand, is considerably greater when no combustion is taking place since the air velocities at the diffuser outlet are much higher for this condition. A fuel meter operating on stagnation or static pressure alone gives much leaner mixtures before ignition than after. However, a fuel meter operated by impact pressure would give a richer mixture before ignition. By properly combining these pressures, a fuel meter can be constructed that will give relatively little change in air-fuel ratio during the transition from non-burning or "cold" conditions to burning or "hot" condition.

The same air-fuel ratio can be maintained uniformly during both "cold" and "hot" flight conditions, as previously pointed out, by utilizing a fractional part of the static plus the full impact pressure to control the fuel flow. For example, these pressures can be combined in several practical ways to give total flow control pressures as shown by the expressions:

$$P_T = S + I \quad (1)$$
$$P_T = \tfrac{1}{2} S + I \quad (2)$$
$$P_T = \tfrac{1}{4} S + I \quad (3)$$

where $P_T$ = total flow control pressure
$S$ = static pressure
$I$ = impact pressure It is assumed, of course, in the above discussion that air to fuel values are based on the use of a meter valve through which the flow is a direct linear function of the control pressure used. Of the three fuel flow control pressures given by the expressions above, that give by Equation 2, i.e., one half of the static pressure plus the full impact pressure, maintains most nearly the same air-fuel ratio during both pre-ignition or non-burning and combustion or burning conditions. If it is desirable to ignite at a somewhat leaner air-fuel mixture than is desired for continuous combustion, a greater fraction of static pressure is utilized for the control pressure.

Referring now to the drawings for a more detailed description of the invention, there is shown in FIG. 1 the tubular body of a ram-jet engine or motor, which is indicated generally by reference numeral 10. The ram-jet engine is usually a part of an aerial missile or the like, but is not limited to this particular application. Body 10 is formed of heavy gauge sheet metal, and is open at both ends thereof 12 and 14.

The forward end of the body 10 is partially enclosed by a nose assembly section 16 which included a nose or ogive 18 of metal or plastic, which is either integral with a frusto-conical diffuser section 20, as shown, or separated therefrom.

Ogive section 16 is formed with a central passage 22, and has its rear end 24 communicating with frusto-conical diffuser section 20. The rear end 26 of diffuser section 20 is attached to a tailpipe section or combustor section 28 by means of flange member 30. Liquid fuel under uniform or constant pressure is contained in an annular cavity or chamber 32 between body 10 and diffuser section 20.

A fuel metering arrangement 34, with which this invention is particularly concerned, is shown in FIG. 1 attached to the upstream end of a tracer holder 36 which forms a part of a radial gutter igniter 38. Fuel at a constant fuel pressure enters the fuel meter arrangement 34 through passageway 40 from fuel cavity or chamber 32 or through passageways provided in radial struts (not shown). The unmetered fuel flows through a metering valve to passageways 42 to an injection arrangement 44 having injection nozzles 46, where it is injected into the air stream which flows through the central passage 22 in ogive section 16 and diffuser section 20. After the fuel has been injected into the air stream, the air-fuel mixture is ignited further downstream by the igniter arrangement 38.

In FIG. 3 there is shown an enlarged view of the fuel metering arrangement 34 illustrated in FIG. 1. This metering arrangement 34 consists essentially of a tubular housing 48 which is conical shaped in its forward portion 49. Housing 48 contains an evacuated Sylphon type bellows 50 which is separated from a smaller evacuated Sylphon type metal bellows 52 by a partition wall 54. This wall 54 has an opening 55 therein so that the interiors of the bellows 50 and 52 will be in open communication with each other. Both of these bellows are connected to a rod member 56 at 57 and 58. This rod passes through the opening 55 in wall 54. The bellows, through rod member 56, actuate a valve arrangement or mechanism 59 connecting two chambers 60 and 62. Chamber 60 contains unmetered fuel from pressurized fuel chamber 32, while chamber 62 contains the fuel that has been metered by the fuel metering valve arrangement 59. The metered fuel from chamber 62 passes through passageways 42 to the injection system, as previously described.

The conical portion 49 of tubular housing 48 has a small opening 64 for the static and impact pressure from the exit of diffuser section 20. These pressures are exerted on the forward face 66 of metal bellows 50, while the static pressure from the diffuser exit is introduced to the rear face 68 of metal bellows 52 through an opening 70.

Thus it is seen that the face 66 of metal bellows 50 is in contact with the stagnation (static plus impact) pressure, while bellows 52, of less area, is operated by static pressure alone. The net force $F_N$, acting on the bellows 50 and 52 to oppose the force of their spring action or that of auxiliary springs (not shown) is given by:

$$F_N = A_1 p_t - A_2 p_s \quad (4)$$

where $A_1$ is the area of face 66 of bellows 50
$A_2$ is the area of face 68 of bellows 52
$p_t$ is the stagnation pressure, i.e., impact pressure plus static pressure
$p_s$ is the static pressure since $$p_i = p_t - p_s \quad (5)$$

where $p_i$ is the impact pressure:

$$F_N = (A_1 - A_2)_{p_s} + A_1 p_i \quad (6)$$

Since, as previously explained, the static pressure, $p_s$, increases when ignition takes place and the impact pressure, $p_t$, decreases, proper choice of areas $A_1$ and $A_2$ can make the net force on the fuel meter almost constant during this transition, and the setting of valve 59 will remain constant, and thus give a constant air-fuel ratio at a fixed fuel delivery pressure.

Summarizing the aforegoing, an aerial missile, which includes the ram-jet engine having the fuel metering arrangement just described, and a detachable launching carriage, is launched by means of the launching carriage from a platform or the like (all of which are not shown). At a certain point along the trajectory of the aerial missile, the launching carriage will have spent its power and will, therefore, separate from the aerial missile. The ram-jet engine previously described will then furnish the source of power for the aerial missile.

As the aerial missile moves through the atmosphere, remote control means (not shown) will ignite the air-fuel mixture by means of igniter 38 which has oxygen and a starting fuel fed through passageways 71 and 72. A uniform air-fuel ratio is maintained by means of fuel metering arrangement 34 by means of which the opening of the metering valve is controlled in relation to the stagnation and static pressures, and consequently varied in proportion to the rate of air flow through the diffuser.

Fuel from annular tank or chamber 32 is introduced into unmetered chamber section 60 through passageway 40 where it is metered by means of contoured valve 59 attached to rod member 56. This rod member, as previously described, is actuated by metal bellows 50 and 52. The fuel after being metered by the valve 59 is fed into chamber 62. From chamber 62, the fuel is fed through passageway 42 to the nozzle arrangement 44, and hence to injection nozzles 46, where it is mixed with the air flow through central passage 22 and diffuser section 20. The fuel mixture is then swept further downstream in the tailpipe section 28 where it is ignited. The gases generated by the burning of the fuel mixture are then expanded through an exit nozzle arrangement, not shown, to power the aerial missile along its trajectory.

In a general manner, while there has been, in the above description, disclosed what is deemed to be a practical and efficient embodiment of the invention, it should be understood that the invention is not limited thereto, as changes can be made in the arrangement, disposition, and form of the parts without departing from the principle and spirit of the invention as comprehended within the scope of the appended claims.

What is claimed is:

1. In combination, an aerial missile having a body in the form of an elongated tubular duct, a diffuser in said duct, a fuel chamber in the body of said duct, a fuel line located between said fuel chamber and duct, a flow control valve in said fuel line, and a pressure differential operated device including at least two bellows of different head sizes mounted in said aerial missile for controlling said flow control valve and thus the rate of fuel flow from said fuel chamber to said duct, the interiors of said bellows being in open communication with each other, each bellows being arranged to oppose the movement of the other, one of said bellows being arranged to be responsive to both impact and static pressures, with the other said bellows being arranged to be responsive only to said static pressure, whereby, depending upon the relative head areas of said bellows, a fraction of the static pressure acting on one of said bellows is cancelled by the static pressure acting on the other bellows, leaving the full impact pressure and remaining static pressure differential to control the rate of fuel flow from said fuel chamber to said duct.

2. In combination, an aerial missile having a body in the form of an elongated tubular duct, a diffuser in said duct, means for deriving the impact and static pressures in said duct at the diffuser exit, means for deriving only said static pressure in said duct at the diffuser exit, a pressure differential operated device including at least two bellows of different head sizes arranged to be in open communication with each other, each bellows being arranged to oppose the movement of the other, one of said bellows being controlled by said impact and static pressures and the other by said static pressure alone, a fuel line, and flow control valve actuated by said pressure differential operated device, said valve being interposed in said fuel line.

3. An arrangement as set forth in claim 2, wherein the larger of said bellows is responsive to said impact and static pressures and the smaller of said bellows is responsive only to static pressure.

4. A device for controlling the rate of fuel flow to the combustor of an aerial missile, comprising, means for deriving impact and static pressures from the surrounding atmosphere, means for deriving only said static pressure from the surrounding atmosphere, a pressure differential operated device including at least two bellows of different head sizes, the interiors of said bellows being in open communication with each other, each bellows being arranged to oppose the movement of the other, one of said bellows being arranged to be responsive to both said impact and static pressures, with the other bellows being arranged to be responsive only to said static pressure, a fuel line, and a flow control valve, said valve being interposed in said fuel line, whereby, depending upon the relative head sizes of said bellows, a fraction of the static pressure acting on one of said bellows is cancelled by the static pressure acting on the other bellows, leaving the full impact pressure and the remaining static pressure differential to control said flow control valve in said fuel line.

5. In an aerial missile having a body in the form of an elongated tubular duct, a diffuser in said duct, a fuel chamber in the body of said duct, nozzle means in said duct, and a fuel line between said fuel chamber and said nozzle means; the combination with a fuel control device for controlling the rate of fuel flow to said nozzles, said device including means for deriving the impact and static pressures from the surrounding atmosphere, means for deriving only the static pressure from the surrounding atmosphere, a pressure differential operated device including at least two bellows of different head sizes, the interiors of said bellows being in open communication with each other, each bellows being arranged to oppose the movement of the other, one of said bellows being responsive to both the impact and static pressures, with the other said bellows being responsive only to said static pressure, and a flow control valve actuated by said pressure differential operated means, said valve being interposed in said fuel line.

6. In an aerial missible having a body in the form of an elongated tubular duct, a diffuser in said duct, a fuel chamber in the body of said duct, nozzle means in said duct, and a fuel line between said fuel chamber and said nozzle means; the combination with a fuel control device for controlling the rate of fuel flow to said nozzles, said device including means for deriving impact and static pressures from the surrounding atmosphere, means for deriving only said static pressure, a pressure differential operated means including at least two different size bellows controlled by the full impact pressure and only a fraction of said static pressure, and a flow control valve actuated by said pressure differential operated means, said vlave being interposed in said fuel line.

7. An arrangement as set forth in claim 6, wherein the fuel in said fuel chamber is under a constant source of pressure.

8. In an aerial missile having a body in the form of an elongated tubular duct, a diffuser in said duct, a fuel chamber in the body of said duct, said fuel being under a constant source of pressure, nozzle means in said duct, and a fuel line between said fuel chamber and said nozzle means; the combination with a fuel control device for controlling the rate of fuel flow to said nozzles, said device including means for deriving the impact and static pressures from the surrounding atmosphere, means for deriving only said static pressure, a pressure differential operated means including at least two different sized bellows, one of said bellows being controlled by said impact and static pressure the other bellows being controlled by said static pressure alone, and a flow control valve actuated by said pressure differential operated means, said valve being interposed in said fuel line.

9. A device for controlling the rate of fuel flow to a combustor, comprising, means for deriving impact and static pressures from the surrounding atmosphere, means for deriving only static pressure from the surrounding atmosphere, a pressure differential operated device including at least two bellows, said bellows being arranged to oppose each other, one of said bellows being responsive to said impact and static pressures and the other said bellows being responsive only to said static pressure, a fuel line, and a flow control valve actuated by said pressure differential operated device, said valve being interposed in said fuel line.

References Cited in the file of this patent

UNITED STATES PATENTS

| | | |
|---|---|---|
| 2,540,594 | Price | Feb. 6, 1951 |
| 2,550,678 | Deacon | May 1, 1951 |
| 2,566,319 | Deacon | Sept. 4, 1951 |
| 2,629,569 | Andrews | Feb. 24, 1953 |